No. 723,217. PATENTED MAR. 17, 1903.
H. SPENCE.
MANUFACTURE OF TITANOUS CHLORID.
APPLICATION FILED AUG. 15, 1902.
NO MODEL.
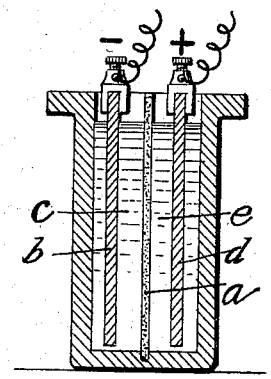
Witnesses
Norris A. Clark.
Alex. Scott
Inventor
Howard Spence
By Geo. T. Whitney
Attorney

UNITED STATES PATENT OFFICE.

HOWARD SPENCE, OF MANCHESTER, ENGLAND.

MANUFACTURE OF TITANOUS CHLORID.

SPECIFICATION forming part of Letters Patent No. 723,217, dated March 17, 1903.

Application filed August 15, 1902. Serial No. 119,803. (No specimens.)

*To all whom it may concern:*

Be it known that I, HOWARD SPENCE, a subject of the King of Great Britain and Ireland, and a resident of Manchester, in the county of Lancaster, England, have invented new and useful Improvements in the Manufacture of Titanous Chlorid, of which the following is a specification.

The powerful reducing properties of titanous chlorid (titanium sesquichlorid) have been known for many years; but this knowledge has until quite recently been of scientific importance only, owing to the fact that there existed no known method of preparing it as a commercial product.

The only crystallized compound of titanous chlorid yet known was described by E. Glatzel in the *Deut. Chem. Ges. Ber.*, 9s., 1832, as consisting of $Ti_2Cl_6 + 8H_2O$, in the following terms: "I produced the above combination by evaporating the violet solution obtained by treating titanium with hydrochloric acid until crystallization took place. The solution gradually became darker and finally became cherry-red, depositing very finely-divided titanic acid, which necessitated repeated filtrations. Finally I obtained a salt having a green color which did not again dissolve in water to a clear solution, but always separated out small quantities of titanic acid in extremely fine division, so that the solution appeared to be opalizing. The solution was violet, but became discolored after some time and then showed a titanic-acid reaction. The salt therefore had been subjected to a higher oxidation." Owing to the fact that metallic titanium is unobtainable commercially, this method of producing a titanous chlorid is of no practical value. It has, however, recently been experimentally ascertained, as is incidentally mentioned in the application for Letters Patent of the United States, Serial No. 702,566, dated the 18th of March, 1902, that a solution of titanous chlorid could be obtained by electrochemical means. It was, however, assumed, as stated by Glatzel, that a solution of titanous chlorid could not be evaporated without decomposition, and that therefore a solution prepared by ordinary electrolytical processes was of the highest strength practically obtainable; but I have now ascertained that if a solution of titanous chlorid be evaporated under the conditions hereinafter stated, the solution having been prepared substantially as directed, I am thereby enabled to produce a new crystallized compound of titanous chlorid having chemical and physical characteristics different from those possessed by the compound described by Glatzel. The new compound possesses qualities of the highest importance for commercial use as a reducing agent in various manufactures, its reducing power being very much greater than that of the existing commercial reducing agents, such as stannous chlorid.

In carrying out my invention I subject a solution of titanic chlorid, conveniently prepared by dissolving orthotitanic hydrate in hydrochloric acid or by other well-known means, to electrolysis. Such a solution may suitably contain about twenty-five per cent. of $TiCl_4$.

The accompanying drawing illustrates in vertical section a cell adapted to carry out my invention. In such a cell divided into two compartments by a porous diaphragm $a$ and containing a suitable cathode $b$ of lead, for example, in one compartment $c$ and a suitable anode $d$ of carbon, for example, in the other compartment $e$, I introduce the solution of titanic chlorid into the cathode-compartment, and a dilute-acid solution, dilute hydrochloric acid, for example, into the anode-compartment and connect the cathode and anode, respectively, to a suitable source of electric current. I find that I obtain satisfactory results with a current density of about two hundred amperes per square meter under a tension of from three to four volts. On closing the electric circuit the $TiCl_4$ solution is readily and rapidly reduced to $Ti_2Cl_6$, (or $TiCl_3$,) the liquor being kept at the ordinary or at a slightly-elevated temperature. The chlorin gas given off at the positive pole may be collected and utilized by well-known means. More than ninety per cent. of the $TiCl_4$ is readily converted into $TiCl_3$. The solution of $TiCl_3$ thus produced, containing free hydrochloric acid, is then transferred to a suitable vessel, in which it is concentrated to yield the new crystallized compound. Although the solution thus prepared may be concentrated by ordinary evaporation under atmospheric pressure, I prefer to concentrate it at a lower temperature under reduced pressure. Any hydrochloric-acid vapor given off during the evaporation may be condensed by well-known means. Unlike Glatzel's solution of metallic titanium in hydrochloric acid, which, he states, decomposes during evaporation and requires separation of the precipitated $TiO_2$, I find that my solution remains quite stable during evaporation. Any slight decomposition which may occur at the commencement of the concentration of the liquor produced in the way I have described is due not to any decomposition of the titanous chlorid, but to the decomposition of any small remaining quantity of $TiCl_4$ which has escaped reduction during electrolysis. The concentration of the liquor continued until a specific gravity of about 1.5 at 65° to 70° centigrade is obtained yields on cooling an abundant crop of crystals of the new titanous compound, which may then be separated from the mother-liquor. I may also continue the concentration to a higher degree and on cooling the liquor obtain the product as a solid cake, which is a convenient commercial form, or I may continue the evaporation only so far that on cooling the product is in the form of a concentrated aqueous solution.

The new compound produced as hereinbefore described differs essentially from that described by Glatzel, inasmuch as its color is of a fine lilac shade, showing more violet when damp, whereas Glatzel's product is green. The new compound forms a very stable body, soluble with extreme readiness in water with a clear solution. It is highly suitable for manufacturing on the large scale and for the preparation by double decomposition or by other means of other titanous compounds.

What I claim as my invention, and desire to secure by Letters Patent, is—

1. The hereinbefore-described process of obtaining titanous chlorid from titanic chlorid, which consists in subjecting an aqueous solution of titanic chlorid to the action of an electric current between a cathode and an anode in an electrolytic cell divided by a porous partition into a cathode-compartment and an anode-compartment, the titanic-chlorid solution being contained in the cathode-compartment while the anode-compartment contains a dilute-acid solution.

2. The new compound of titanous chlorid obtained by electrolyzing a solution containing titanic chlorid, which compound is a powerful reducing agent easily soluble in water, and is of a lilac color.

In testimony whereof I have signed my name to this specification in the presence of two subscribing witnesses.

HOWARD SPENCE.

Witnesses:
ARTHUR MILLWARD,
JAS. STEWART PROUDFOOT.